(12) United States Patent
Asada et al.

(10) Patent No.: US 11,725,949 B2
(45) Date of Patent: Aug. 15, 2023

(54) METHOD FOR DETERMINING UPDATE AREA, INFORMATION PROCESSING DEVICE, AND PROGRAM

(71) Applicant: Faurecia Clarion Electronics Co., Ltd., Saitama (JP)

(72) Inventors: Katsuya Asada, Saitama (JP); Yuichiro Nakagawa, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 110 days.

(21) Appl. No.: 17/271,136

(22) PCT Filed: Jul. 29, 2019

(86) PCT No.: PCT/JP2019/029624
§ 371 (c)(1),
(2) Date: Feb. 24, 2021

(87) PCT Pub. No.: WO2020/044907
PCT Pub. Date: Mar. 5, 2020

(65) Prior Publication Data
US 2021/0254984 A1 Aug. 19, 2021

(30) Foreign Application Priority Data
Aug. 29, 2018 (JP) .................................. 2018-160556

(51) Int. Cl.
*G01C 21/32* (2006.01)
*G01C 21/36* (2006.01)

(52) U.S. Cl.
CPC ......... *G01C 21/32* (2013.01); *G01C 21/3605* (2013.01); *G01C 21/3626* (2013.01); *G01C 21/3667* (2013.01)

(58) Field of Classification Search
CPC ................ G01C 21/32; G01C 21/3605; G01C 21/3626; G01C 21/3667; G01C 21/3859;
(Continued)

(56) References Cited

U.S. PATENT DOCUMENTS

2013/0147820 A1* 6/2013 Kalai ................. G01C 21/3889
345/522
2013/0328937 A1* 12/2013 Pirwani .................. G09G 5/373
345/660
(Continued)

FOREIGN PATENT DOCUMENTS

JP 2000-121371 A 4/2000
JP 2007-121153 A 5/2007
(Continued)

OTHER PUBLICATIONS

English Translation JP2009270831A.*
(Continued)

*Primary Examiner* — Rami Khatib
(74) *Attorney, Agent, or Firm* — Volpe Koenig

(57) ABSTRACT

An object of the present invention is to provide a method for determining an update area, an information processing device, and a program that appropriately determines an area for updating map information. The method for determining the update area is implemented by an update area determination system, and the update area determination system includes a point identification unit and a target area determination unit. The point identification unit executes a point identification procedure for identifying two points on a map, and the target area determination unit executes a target area determination procedure for determining a target area that is a target for an update when map information is updated using a distance between the two points and position information of a representative point preset for each of a plurality of areas formed by dividing the map.

10 Claims, 13 Drawing Sheets

(58) Field of Classification Search
CPC ... G06F 16/903; G06F 16/909; G08G 1/0969; G09B 29/00
See application file for complete search history.

(56) References Cited

U.S. PATENT DOCUMENTS

2014/0136099 A1    5/2014  Choi et al.
2019/0197777 A1*   6/2019  Steinbrücker .......... G06V 20/20

FOREIGN PATENT DOCUMENTS

| JP | 2009-270831 A    | 11/2009 | |
|----|------------------|---------|---|
| JP | 2016-169975 A    | 9/2016  | |
| WO | WO-2016020357 A1 * | 2/2016 | ............ B60W 40/04 |

OTHER PUBLICATIONS

International Search Report and English Translation, PCT/JP2019/029624, dated Oct. 1, 2019 (4 pgs.).
Japanese Office Action dated May 16, 2023 for Japanese Patent Application No. 2020-540167.

\* cited by examiner

FIG. 2

REPRESENTATIVE POINT INFORMATION 121

| REPRESENTATIVE POINT IDENTIFIER | COORDINATES |
|---|---|
| d001 | (***, ***) |
| d002 | (***, ***) |
| d003 | (***, ***) |
| ⋮ | ⋮ |

METHOD FOR DETERMINING UPDATE AREA, INFORMATION PROCESSING DEVICE, AND PROGRAM

TECHNICAL FIELD

The present invention relates to a method for determining an update area, an information processing device, and a program. The present invention claims the priority of application number 2018-160556 of the Japanese patent filed on Aug. 29, 2018, and for designated countries where incorporation by reference to the literature is permitted, the content described in the application is incorporated into this application by reference.

BACKGROUND ART

There are various technologies that a terminal device acquires map information managed by a server device.

Patent Literature 1 discloses a technology relating to a mobile terminal device. In paragraph [0016] of Patent Literature 1, there is a description "along with acquiring the current location information, the map data of a predetermined region including the current location is acquired from the map data server based on the current location information, and the map is displayed together with the current location on the screen of the display 10. While the user is moving toward the destination, if the acquisition map calculation processing unit 16 detects that the current location determined by the current location detection unit 7 has reached a position a predetermined distance away from the boundary with the outside of the range of the map data within the range of the map data stored in the map data storage unit 6 (Y of ST11), the acquisition map calculation processing unit 16 proceeds with the advance downloading process".

CITATION LIST

Patent Literature

Patent Literature 1: JP 2007-121153 A

SUMMARY OF INVENTION

Technical Problem

When map information is updated, it is possible to anticipate that the communication load is reduced by dividing the map into a plurality of areas and updating each area.

The mobile terminal device described in Patent Literature 1 performs a route search from the current location to the destination and newly acquires map information of a predetermined region using the position of the mobile terminal device after movement. However, there is a possibility to increase the processing load due to performing the route search and put a burden on the processing performance required for determining the map information to be updated.

The present invention has been made in view of the points described above, and an object of the present invention is to provide a method for determining an update area, an information processing device, and a program that appropriately determine an area for updating map information.

Solution to Problem

The present application includes a plurality of means for solving the above problems, and examples thereof are as follows.

In order to solve the problems described above, a method for determining an update area of the present invention is a method for determining an update area implemented by an update area determination system, the update area determination system including a point identification unit, and a target area determination unit, the method including: by the point identification unit, executing a point identification procedure for identifying two points on a map; and, by the target area determination unit, executing a target area determination procedure for determining a target area that is a target for an update when map information is updated using a distance between the two points and position information of a representative point preset for each of a plurality of areas formed by dividing the map.

Advantageous Effects of Invention

According to the present invention, it is possible to provide a method for determining an update area, an information processing device, and a program for appropriately determining an area for updating map information.

Issues, configurations, and effects other than those described above will be clarified by the description of the following embodiments.

BRIEF DESCRIPTION OF DRAWINGS

FIG. 2 is a diagram illustrating an example of a data structure of representative point information.

DESCRIPTION OF EMBODIMENTS

Figure 1:
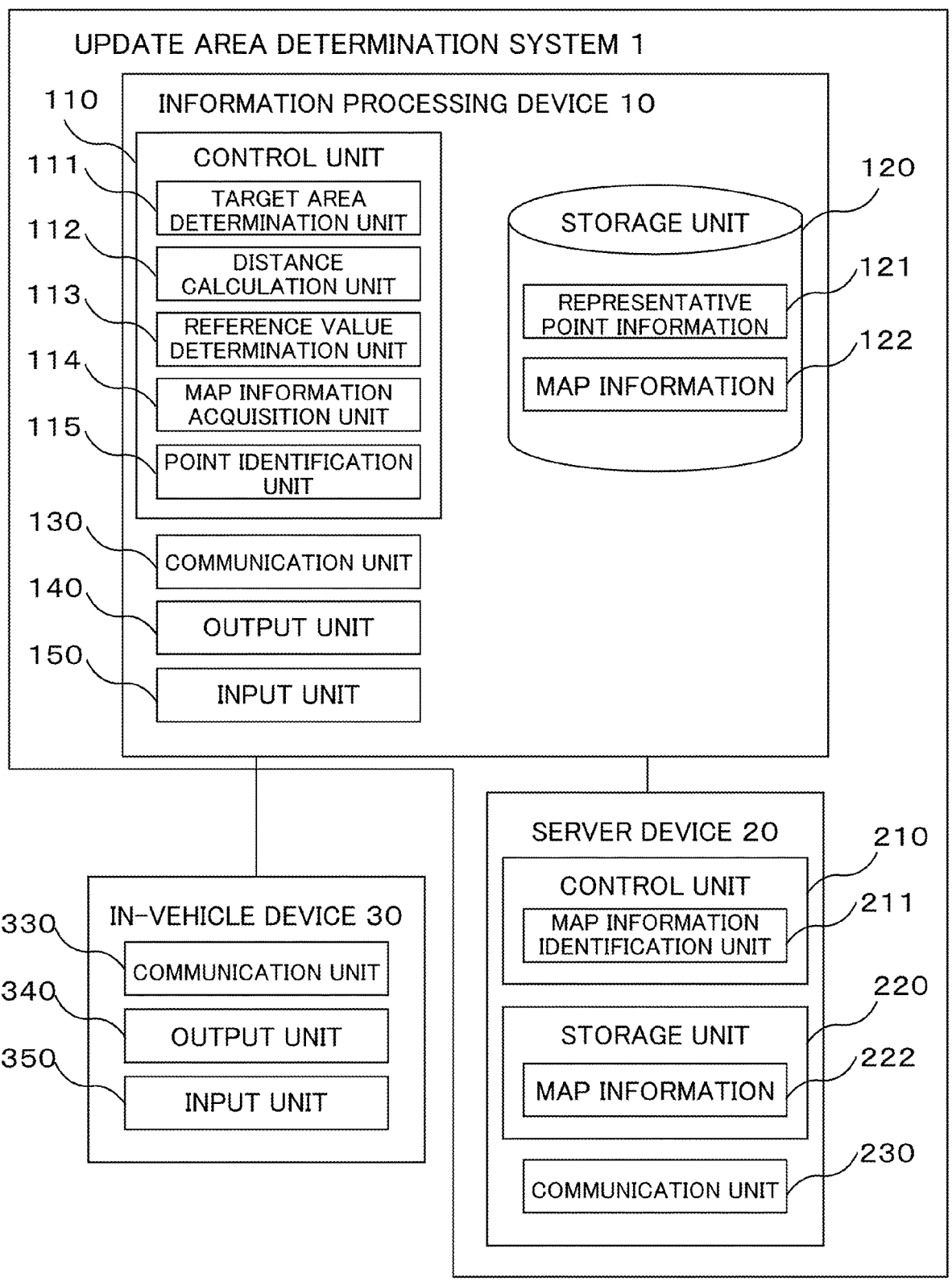
FIG. 1 is a diagram illustrating an example of a functional block configuration of an update area determination system.

Hereinafter, examples of embodiments of the present invention will be described with reference to the drawings. FIG. 1 is a diagram illustrating an example of a functional block configuration of an update area determination system 1. The update area determination system 1 is a system that implements a method for determining an update area and includes an information processing device 10 and a server device 20. The information processing device 10 is communicably connected to the server device 20.

The information processing device 10 is a portable information processing device such as a personal computer (PC), a tablet terminal, a smartphone, or the like and functions as an update area determination device. The server device 20 is an information processing device such as a server computer, a PC, or the like and is operated by, for example, a business operator of a map information providing service.

Also, the update area determination system 1 is communicably connected to the in-vehicle device 30 via a network. The in-vehicle device 30 is a computer device mounted on a vehicle and outputs map information to a passenger of the vehicle. The in-vehicle device 30 may be, for example, a part of a navigation device that provides route information to a driver, or various control devices or the like incorporated in a moving body including a vehicle and includes a display device. Also, the in-vehicle device 30 may be a display device that outputs image information generated by a navigation function (not illustrated in the drawings) included in the information processing device 10.

The information processing device 10 includes a control unit 110, a storage unit 120, a communication unit 130, an output unit 140, and an input unit 150. The control unit 110 controls the entire information processing device 10 in a supervising manner. The storage unit 120 stores information required for processing by the control unit 110. The communication unit 130 transmits and receives information to and from the server device 20 and the in-vehicle device 30.

The output unit 140 generates screen information for displaying information on an output device such as a display and the like. Also, the output unit 140 causes the output device to output a display screen. More specifically, the output unit 140 executes a display procedure for displaying a target area which will be described later so as to be different from other areas. The input unit 150 accepts input of information via an input device such as a touch panel, a hardware key, and the like.

The control unit 110 includes a target area determination unit 111, a distance calculation unit 112, a reference value determination unit 113, a map information acquisition unit 114, and a point identification unit 115. The target area determination unit 111 executes a target area determination procedure for determining a target area that is a target for updating map information 122 stored in the storage unit 120.

In the present embodiment, the map information is updated for each of a plurality of areas formed by dividing the map. Hereinafter, the map information of the United States of America will be used as an example in the description below. In this example, the map information of the United States of America is divided into each state and updated for each state in the information processing device 10. Note that, one or a plurality of representative points are set in advance in the plurality of areas, and it is determined whether or not the area is determined as an update area by using the representative points. Hereinafter, an example in which one representative point is set for one area will be used in the description below. As an example, the representative point is a point at the position of the state capital.

Note that the method for dividing the area being a target of the map information is not limited to the example described above. For example, when the map information providing service targets the map information of the map of Japan, the map information may be divided into prefectures, and each area (prefecture) may have the prefectural office location as a representative point. Also, the map information may be divided into meshes at equal intervals, and each area may have an arbitrary one point determined preliminarily as a representative point.

The target area determination unit 111 determines the target area by using a distance between two points and position information of the representative point. Although the details will be described later, the target area determination unit 111 determines the area represented by the representative point as the target area that is the target for updating map information when the representative point satisfies a predetermined condition.

The distance calculation unit 112 executes a distance calculation procedure for calculating a distance between two points identified by the point identification unit 115, which will be described later (hereinafter, referred to as "distance A"). Also, the distance calculation unit 112 calculates a distance between the representative point and the straight line connecting the two points (hereinafter, referred to as "distance H").

The reference value determination unit 113 executes a reference value determination procedure for determining a reference value using the distance A between the two points. As an example, the reference value is a value calculated by multiplying the distance A by a predetermined reference ratio (for example, 10%). Also, the reference value determination unit 113 changes the reference value according to a predetermined rule until a predetermined condition is satisfied. For example, the reference value determination unit 113 gradually increases the reference value until a predetermined number (for example, one) or more areas are determined. In other words, the reference value determination unit 113 increases the reference value by changing the reference ratio when the number of areas determined by the target area determination unit 111 is less than the predetermined number.

The map information acquisition unit 114 executes a map information acquisition procedure for acquiring the map information of the area determined as the target area from the server device 20.

The point identification unit 115 executes a point identification procedure for identifying two points on the map. The point identification unit 115 identifies, for example, arbitrary two points input via the input unit 150. The two points are, for example, the current location and the destination. The point identification unit 115 may identify the current location by using, for example, the positioning signal receiving device 164 described later.

The storage unit 120 stores representative point information 121 and the map information 122. The representative point information 121 is information regarding a representative point possessed by each of a plurality of areas formed by dividing the map information provided by the present system. The representative point information 121 includes the position information of the representative point. The map information 122 is image information for outputting a map as an image. For example, the map information 122 includes image information of a plurality of areas constituting the map. Note that the map information 122 includes identification information that identifies each area that constitutes the map information.

The server device 20 includes a control unit 210, a storage unit 220, and a communication unit 230. The control unit 210 controls the entire server device 20 in a supervising manner. The storage unit 220 stores map information 222. The communication unit 230 transmits and receives information to and from the information processing device 10. The communication unit 230 transmits the map information 222 to the information processing device 10.

The control unit 210 includes a map information identification unit 211. When the map information identification unit 211 accepts a request for the map information identifying the target area from the information processing device 10, the map information identification unit 211 identifies the map information 222 of the target area. More specifically, when information indicating the request for the map information includes information indicating the representative point, the map information identification unit 211 identifies the map information 222 of the target area represented by the representative point.

Also, when the information indicating the request for the map information includes information indicating an arbitrary point including the two points mentioned above, the map information identification unit 211 identifies the map information 222 of the area including the points. Since a known technology is used for identifying the area that includes an arbitrary point, the description thereof will be omitted.

The map information 222 stored in the storage unit 220 is divided into each area. Also, in a region (not illustrated in the drawings) of the storage unit 220, the correspondence between each representative point and each area is stored. The map information 222 identified by the map information identification unit 211 is transmitted to the information processing device 10 via the communication unit 230.

The in-vehicle device 30 includes a communication unit 330, an output unit 340, and an input unit 350. The communication unit 330 transmits and receives information to and from the information processing device 10. Also, the communication unit 330 receives the map information from the information processing device 10. The output unit 340 outputs information to an output device such as a display. The output unit 340 outputs the map information received from the information processing device 10.

The input unit 350 accepts input of information via an input device such as a touch panel, a hardware key, and the like. In addition, the in-vehicle device 30 may have a storage unit for storing map information. In that case, the information processing device 10 does not need to store the map information in the storage unit included in the information processing device 10.

FIG. 2 is a diagram illustrating an example of a data structure of the representative point information 121. The representative point information 121 has a representative point identifier and coordinates. The representative point identifier is identification information that identifies the representative point. The coordinates are position information of the representative point, for example, the information represented by latitude and longitude. Note that the position information included in the representative point information 121 is not limited to the coordinates, and may be any information that can identify the position of the representative point.

Figure 3:
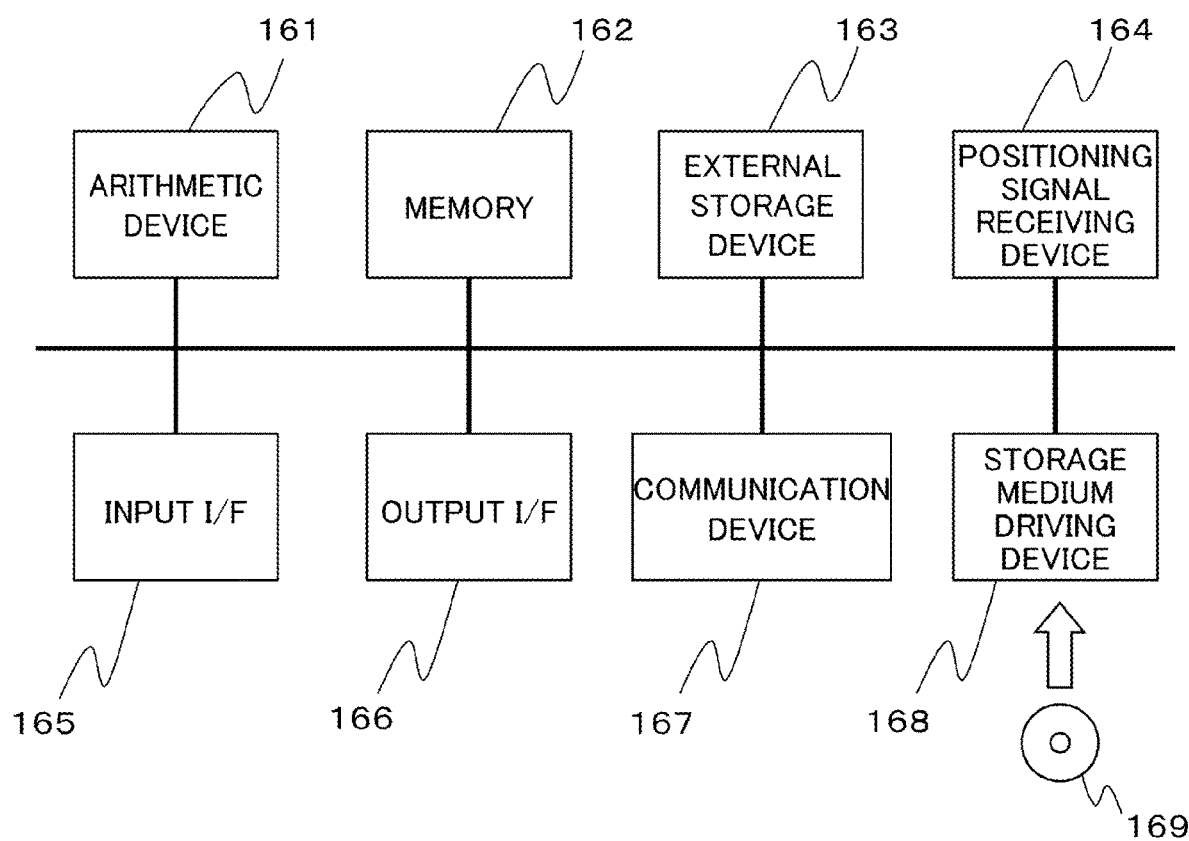
FIG. 3 is a diagram illustrating an example of a hardware configuration of an information processing device.

FIG. 3 is a diagram illustrating an example of a hardware configuration of the information processing device 10. The information processing device 10 includes an arithmetic device 161, a memory 162, an external storage device 163, a positioning signal receiving device 164, an input interface (I/F) 165, an output I/F 166, a communication device 167, and a storage medium driving device 168, and the respective components are connected via a bus.

The arithmetic device 161 is a central processing unit such as a central processing unit (CPU) and the like and executes processing according to a program recorded in the memory 162 or the external storage device 163. Each processing unit constituting the control unit 110 realizes each function by executing the program by the arithmetic device 161.

The memory 162 is a storage device such as a random access memory (RAM), a flash memory, or the like and functions as a storage area from which programs and data are temporarily read. The external storage device 163 is a writable and readable storage medium such as a hard disk drive (HDD).

The positioning signal receiving device 164 receives a signal from a satellite such as a global positioning system (GPS) satellite, and by measuring, for three or more satellites, a distance between a moving object and the satellite and a rate of change of the distance, the positioning signal receiving device 164 measures the current location, traveling speed, and traveling direction of the moving object. Note that the positioning signal receiving device 164 may also receive a positioning signal from a quasi-zenith satellite system or the like used for calculating the current position with higher accuracy than GPS satellites. When the designation of the current location identified by the positioning signal receiving device 164 is accepted, the distance calculation unit 112 calculates the distance between the current location and the destination.

The input I/F 165 is an interface for connecting to an input device (not illustrated in the drawings) that accepts an input operation from a user and accepts an input from, for example, a touch panel or the like. The output I/F 166 is an interface for outputting information to an output device such as a display or the like.

The communication device 167 is a device for connecting the information processing device 10 to a network and is a communication device, for example, such as a network interface card (NIC), and the like. In addition, the communication device 167 is also a communication device that supports a predetermined communication method (for example, Bluetooth (registered trademark)) for communicating with the in-vehicle device 30. The function of the communication unit 130 is realized by the communication device 167. The storage medium driving device 168 is a device that inputs and outputs information from and to a portable medium 169 such as a compact disk (CD), a digital versatile disk (DVD), or the like.

The function of the storage unit 120 is realized by the memory 162 or the external storage device 163. In addition, the function of the storage unit 120 may also be realized by a storage device on the network.

Note that, since the in-vehicle device 30 has the hardware configuration similar to the information processing device 10, the description thereof will be omitted. The in-vehicle device 30 does not need to include the positioning signal receiving device 164 when not performing the processing using the current location.

Figure 4:
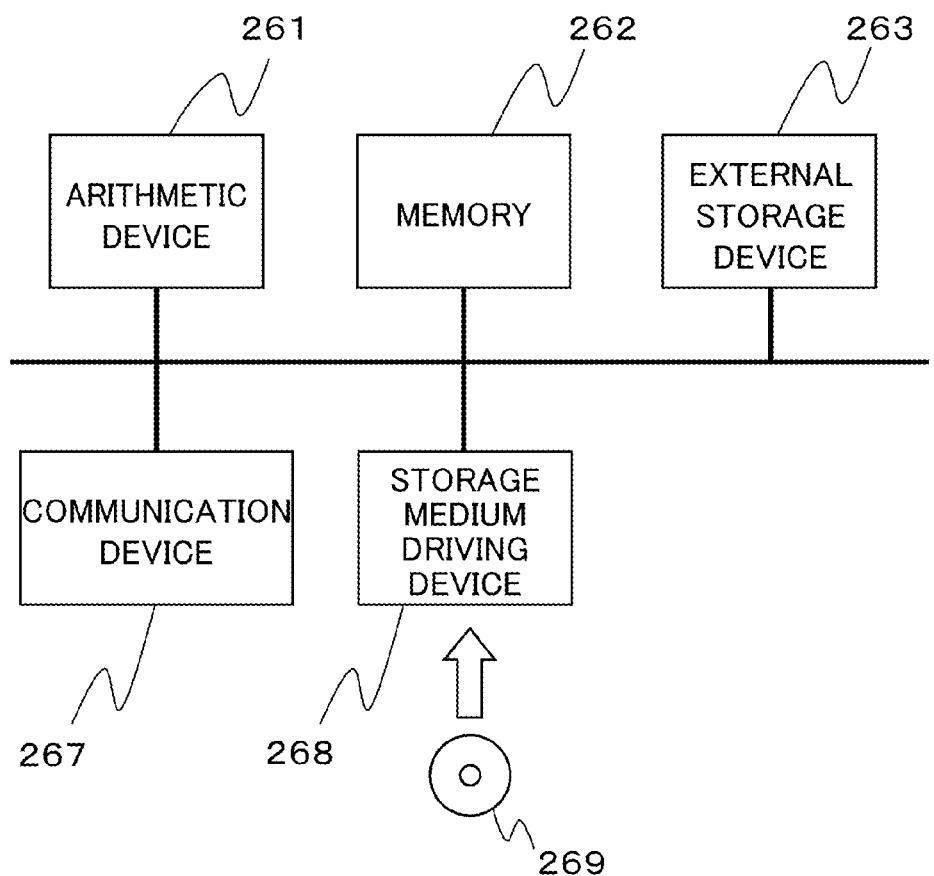
FIG. 4 is a diagram illustrating an example of a hardware configuration of a server device.

FIG. 4 is a diagram illustrating an example of a hardware configuration of the server device 20. The server device 20 includes an arithmetic device 261, a memory 262, an external storage device 263, a communication device 267, and a storage medium driving device 268. Since the configuration of the arithmetic device 261, the memory 262, the external storage device 263, and the storage medium driving device 268 are similar to the configuration of the arithmetic device 161, the memory 162, the external storage device 163, and the storage medium driving device 168 of the information processing device 10 respectively, the description thereof will be omitted. The communication device 267 is a device for connecting the server device 20 to the network and is a communication device, for example, such as an NIC or the like.

Figure 5:
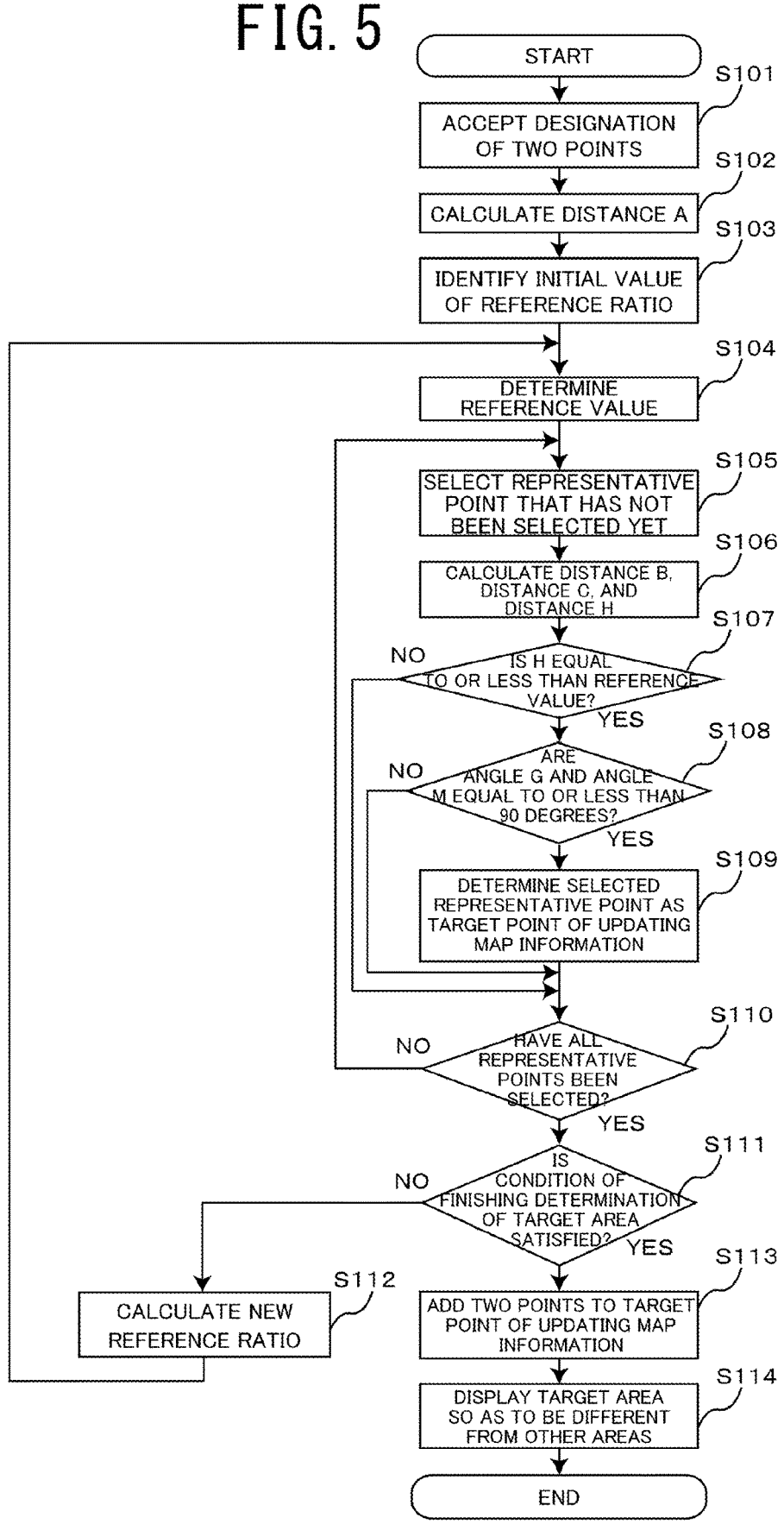
FIG. 5 is a flowchart illustrating an example of the process of determining an update area.

FIG. 5 is a flowchart illustrating an example of the process of determining an update area. This process starts when the information processing device 10 accepts, for example, an input of an instruction to start the process of determining the update area.

First, the input unit 150 accepts the designation of two points (step S101). For example, on the screen inquiring whether or not to designate the current location identified by using the positioning signal receiving device 164, the input unit 150 accepts either input of an instruction for the designation or input of another point. Also, the input unit 150 accepts the input of the second point such as the destination or the like. Note that the input unit 150 may accept an input of arbitrary two points. The point identification unit 115 identifies the two points acquired by the input unit 150.

Figure 8:
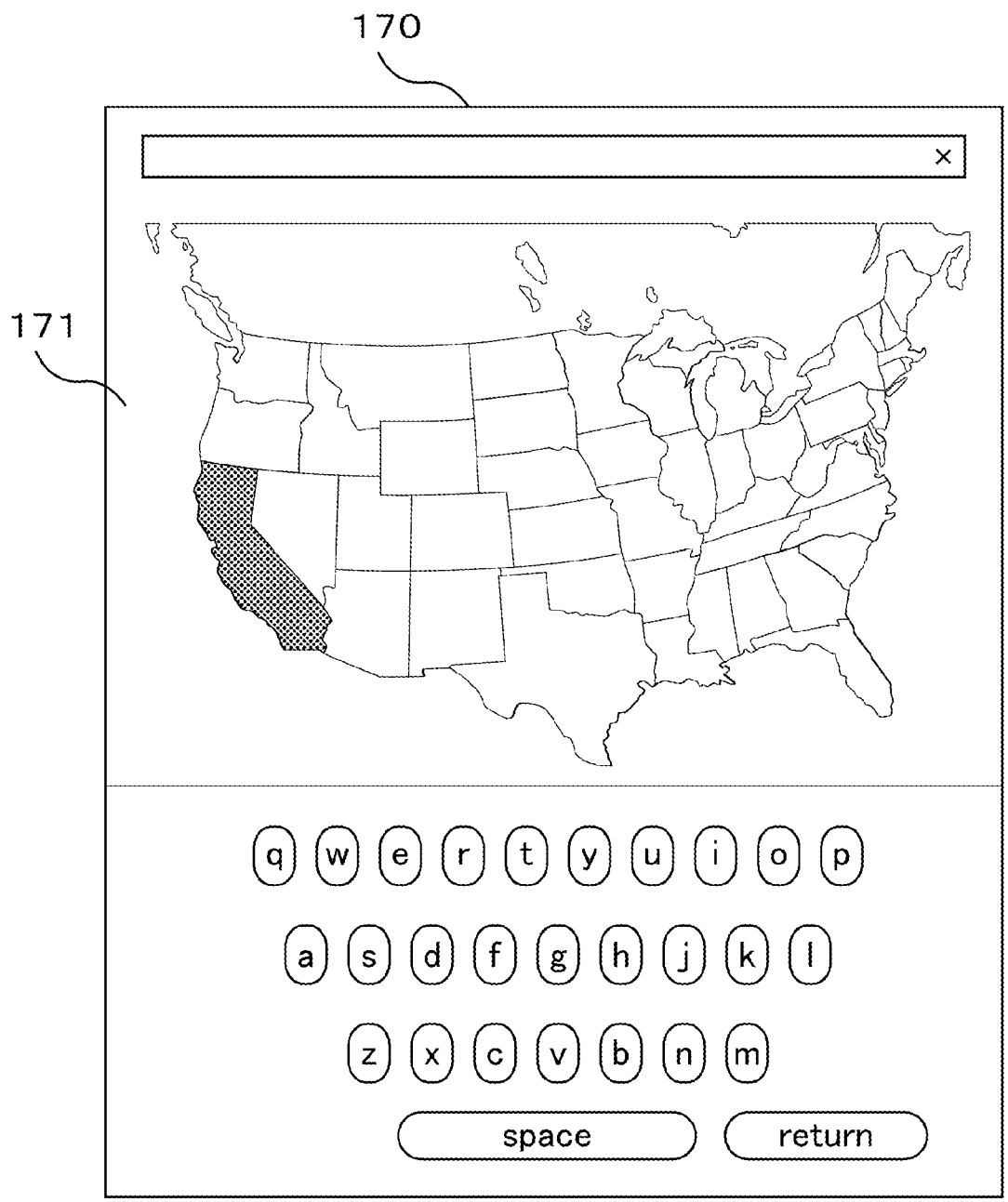
FIG. 8 is a diagram illustrating an example (No. 1) of a map display screen 170.

FIG. 8 is a diagram illustrating an example (No. 1) of a map display screen 170. For example, the output unit 140 of the information processing device 10 generates screen information of the map display screen 170 and displays it on the display via the output I/F 166.

The map display screen 170 has a map display region 171. On the map display screen 170 illustrated in FIG. 8, in addition to the map display region 171, a region for accepting an input of a character and a region for displaying the entered character are illustrated. For example, the point identification unit 115 identifies the current location as one of the two points based on the information received by the positioning signal receiving device 164. The output unit 140 displays an area (a state) including the current location in the map display region 171 so as to be different from other areas. Note that the point identification unit 115 may also identify an arbitrary one point input to the map display screen 170. In that case, the output unit 140 displays the area that includes the arbitrary one point so as to be different from other areas.

Figure 9:
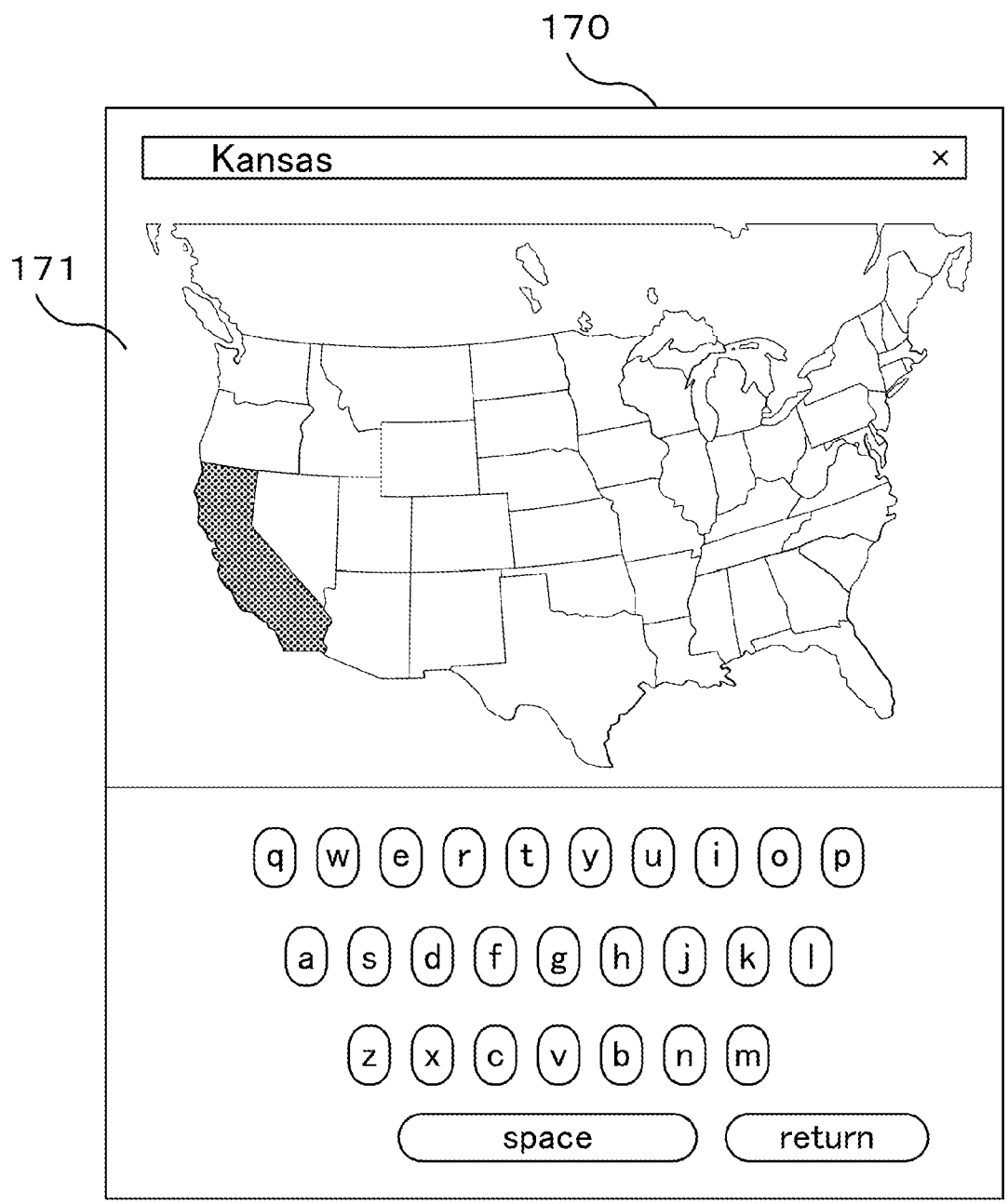
FIG. 9 is a diagram illustrating an example (No. 2) of the map display screen 170.

FIG. 9 is a diagram illustrating an example (No. 2) of the map display screen 170. FIG. 9 is an example of the map display screen 170 when the character string "Kansas" is entered into the map display screen 170 illustrated in FIG. 8. The entered character string is displayed at the top of the map display region 171. For example, the character string "Kansas" is a character string indicating the destination.

Figure 10:
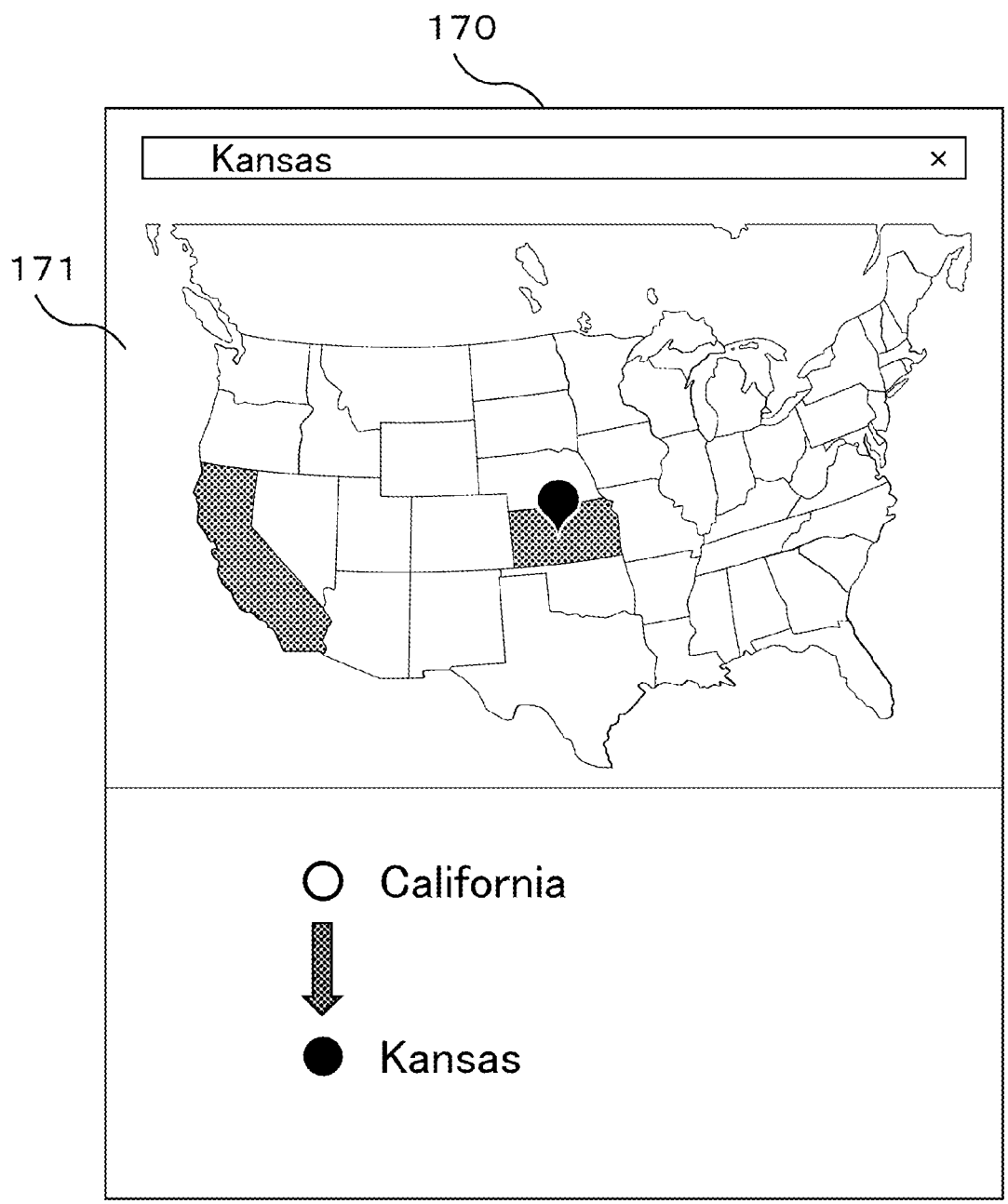
FIG. 10 is a diagram illustrating an example (No. 3) of the map display screen 170.

FIG. 10 is a diagram illustrating an example (No. 3) of the map display screen 170. The point identification unit 115 identifies the other one of the two points based on the input information. The output unit 140 displays an area (a state) including the identified point in the map display region 171 so as to be different from other areas. Note that, as illustrated in FIG. 10, the map display screen 170 may display a character string indicating two points identified by the point identification unit 115.

The explanation returns to FIG. 5. Next, the distance calculation unit 112 calculates the distance A (step S102). Specifically, the distance calculation unit 112 calculates the distance A between the two points identified in step S101. Hereinafter, for the sake of convenience, the two points will be described as being the current location and the destination.

Next, the reference value determination unit 113 identifies an initial value of the reference ratio (step S103). Specifically, the reference value determination unit 113 identifies the initial value (for example, 10%) of a preset reference ratio.

Next, the reference value determination unit 113 determines the reference value (step S104). Specifically, the reference value determination unit 113 determines the reference value using the distance A calculated in step S102 and the reference ratio. For example, the reference value determination unit 113 determines a value obtained by multiplying the distance A by the reference ratio as the reference value.

Next, the target area determination unit 111 selects a representative point that has not been selected yet (step S105). Specifically, the target area determination unit 111 selects a representative point identifier that has not yet been selected from the representative point identifiers included in the representative point information 121. For example, the target area determination unit 111 associates a flag indicating being selected with the representative point identifier of the selected representative point.

Next, the distance calculation unit 112 calculates a distance B, a distance C, and a distance H (step S106).

Figure 6:
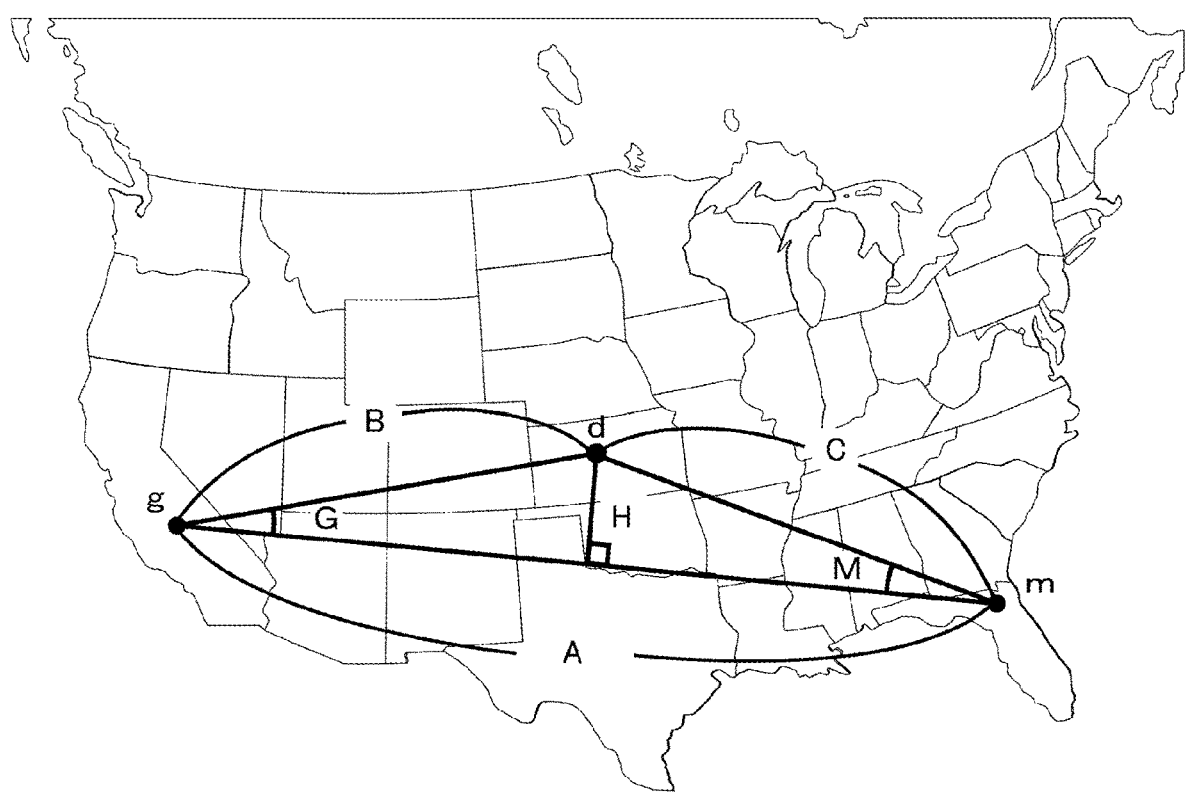
FIG. 6 is a diagram illustrating an example of an outline of a distance calculation process.

FIG. 6 is a diagram illustrating an example of an outline of a distance calculation process. In the example illustrated in FIG. 6, the current location is to be g, and the destination is to be m. Also, the representative point identified in step S105 is to be d. In FIG. 6, the representative point d in Kansas is identified. The distance calculation unit 112 refers to the representative point information 121 and identifies the position information of the representative point d. The distance calculation unit 112 calculates the distance between the current location and the representative point as the distance B. Also, the distance calculation unit 112 calculates the distance between the representative point and the destination as the distance C.

Also, the distance calculation unit 112 calculates the distance H between the straight line connecting the two points and the representative point. The edge perpendicular theorem is used for the calculation, as expressed in the mathematical formulae below.

[Mathematical Formula 1]

$$s=(A+B+C)/2 \qquad (1)$$

[Mathematical Formula 2]

$$H = \frac{2\sqrt{s(s-A)(s-B)(s-C)}}{A} \qquad (2)$$

The explanation returns to FIG. 5. Next, the target area determination unit 111 determines whether or not the distance H is equal to or less than the reference value (step S107). Specifically, the target area determination unit 111 determines whether or not the distance H calculated in step S106 is equal to or less than the reference value determined in step S104. That is, it is possible to describe that the target area determination unit 111 determines whether or not the distance H between the representative point and the straight line connecting the two points satisfies a predetermined condition determined by the reference value. Note that the predetermined condition is not limited to the condition indicating that the distance H is equal to or less than the reference value. It is sufficient if the target area determination unit 111 determines whether or not the distance H satisfies the predetermined condition determined by the reference value. For example, a representative point having a distance H less than the value obtained by multiplying the reference value by a predetermined number may be determined to satisfy the condition.

When the target area determination unit 111 determines that the distance H is not equal to or less than the reference value (when "NO" in step S107), the process proceeds to step S110.

When the target area determination unit 111 determines that the distance H is equal to or less than the reference value (when "YES" in step S107), the target area determination unit 111 determines whether the angle G and the angle M are 90 degrees or less (step S108).

FIG. 6 will be referred to in the description below. The angle dgm is to be the angle G, and the angle dmg is to be the angle M. Distance A, distance B, and distance C are applied to the law of cosines. When the angle M=θ and −1<cos θ<0, it is possible to describe that the angle M exceeds 90 degrees. The target area determination unit 111 determines whether or not both the angle G and the angle M are 90 degrees or less.

Similarly, the target area determination unit 111 determines whether or not the angle G is 90 degrees or less. When the target area determination unit 111 determines that the angle G and the angle M are not 90 degrees or less (when "NO" in step S108), that is, one or both of the angle G and the angle M exceeds 90 degrees, the process proceeds to step S110.

Additionally, in this process, when the distance H is less than or equal to the reference value and, in a triangle formed by connecting the two points and the representative points, both of the angles having each of the two points as the vertices are 90 degrees or less, it is regarded that the distance from the current position or destination to the area related to the representative point is short, and the representative point is determined as the target point of updating map information. Conversely, when the distance H exceeds the reference value, or when either of the angles having each of the two points as the vertices exceeds 90 degrees, it is regarded that the distance from the current position or destination to the area related to the representative point is long, and it is controlled not to determine the representative point as the target point of updating map information.

When the target area determination unit 111 determines that the angle G and the angle M are 90 degrees or less (when "YES" in step S108), the target area determination unit 111 determines the selected representative point as the target point of updating map information (step S109). Specifically, the target area determination unit 111 determines the representative point selected in step S105 as the point to be updated in the map information 122. The above case is synonymous with that the target area determination unit 111 determines the area represented by the representative point as the target area that is the target for updating the map information 122.

Next, the target area determination unit 111 determines whether or not all of the representative points have been selected (step S110). Specifically, the target area determination unit 111 determines whether or not all of a plurality of representative point identifiers included in the representative point information 121 has been selected. When the target area determination unit 111 determines that all of the representative points have not been selected (when "NO" in step S110), the target area determination unit 111 returns the process to step S105. That is, another representative point that has not yet been selected is selected.

When the target area determination unit 111 determines that all of the representative points have been selected (when "YES" in step S110), the target area determination unit 111 determines whether or not a condition of finishing the determination of the target area is satisfied (step S111).

As an example, the condition of finishing the determination of the target area is to determine a predetermined number or more of target points of updating map information. For example, when a straight line connecting two points crosses a bay, despite it is desired to update the map information 122 of the area located along the bay, the distance between the straight line connecting the two points and the representative point of the area is far, therefore, it is conceivable that the representative point is not determined as the target point of updating map information. Therefore, in this example, the lower limit value of the number of target points of updating map information is set preliminarily. When the number of representative points determined as the target points of updating map information in step S111 is less than a predetermined number (for example, one), the target area determination unit 111 determines that the condition of finishing the determination of the target area is not satisfied.

Note that when the condition of finishing the determination of the target area is not satisfied, the reference value determination unit 113 changes the reference value according to a predetermined rule. That is, the reference value is changed according to the predetermined rule until the target area determination unit 111 determines a predetermined number or more of the target areas.

In another example, the condition of finishing the determination of the target area is to satisfy either the determination of a predetermined number or more of the target points of updating map information or the upper limit value of the reference ratio. When the reference ratio is excessively large, there is a possibility that the representative point whose distance from the two points is far and that is not desired to update the map information 122 is determined as the target point of updating map information. Therefore, the upper limit value of the reference ratio is set preliminarily. When the number of representative points determined as the target points of updating map information in step S111 is less than a predetermined number (for example, one) and the reference ratio is less than the upper limit value, the target area determination unit 111 determines that the condition of finishing the determination of the target area is not satisfied.

Note that the conditions for finishing the determination of the target area are not limited to the examples described above. It is sufficient if the representative points that are close to the current location and the destination are determined as the target points of updating map information.

When the target area determination unit 111 determines that the condition of finishing the determination of the target area is not satisfied (when "NO" in step S111), the target area determination unit 111 calculates a new reference ratio (step S112). The target area determination unit 111 calculates the new reference ratio by using a predetermined calculation formula with respect to the current reference ratio. For example, the target area determination unit 111 increases the reference ratio by adding a predetermined value (for example, "10") to the current reference ratio. After that, the target area determination unit 111 returns the process to step S104.

Additionally, in the example in which the determination of one or more target points of updating map information is the condition of finishing the determination of the target area, if there is no determined target area, the reference ratio increases in step S112. That is, in the subsequent step S104, the reference value increases.

When the target area determination unit 111 determines that the condition of finishing the determination of the target area is satisfied (when "YES" in step S111), the target area determination unit 111 adds the two points to the target points of updating map information (step S113). Specifically, the target area determination unit 111 newly determines the two points designated in step S101 as the target points of updating map information in addition to the target points of updating map information determined in step S109. The above case is synonymous with that the target area determination unit 111 determines each of the areas having the two points as the target area.

Next, the output unit 140 displays the target area so as to be different from other areas (step S114). Specifically, the output unit 140 displays the target area having the target points of updating map information determined in step S113 so as to be different from a region on the map excluding the target area. After that, the target area determination unit 111 finishes the processing of this flowchart.

Figure 11:
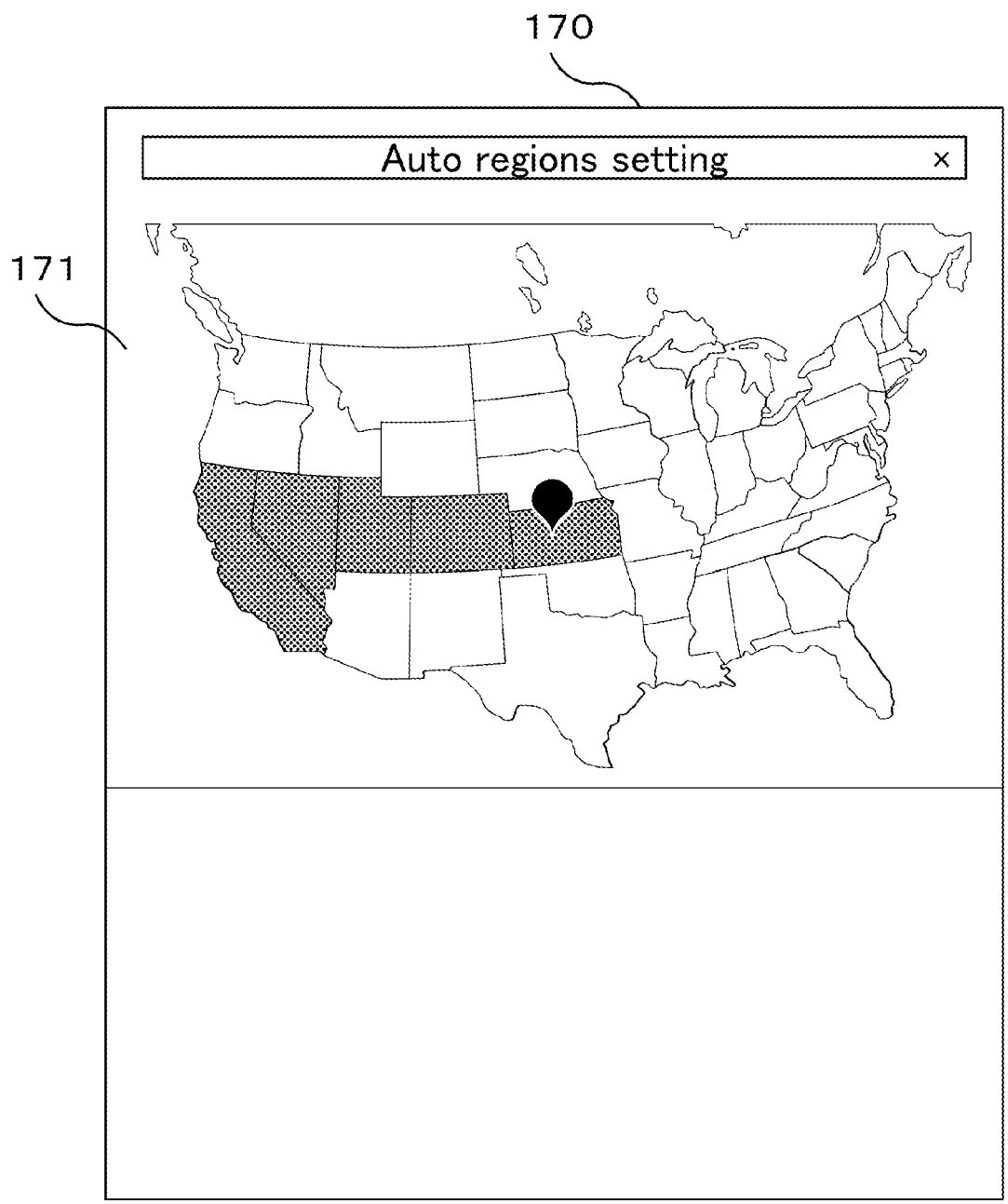
FIG. 11 is a diagram illustrating an example (No. 4) of the map display screen 170.

FIG. 11 is a diagram illustrating an example (No. 4) of the map display screen 170. On the map display screen 170, the target area that is a target for an update when map information is updated is displayed in a mode different from other areas. By referring to the map display screen 170, it is possible to grasp efficiently the area where the map information is updated.

Figure 7:
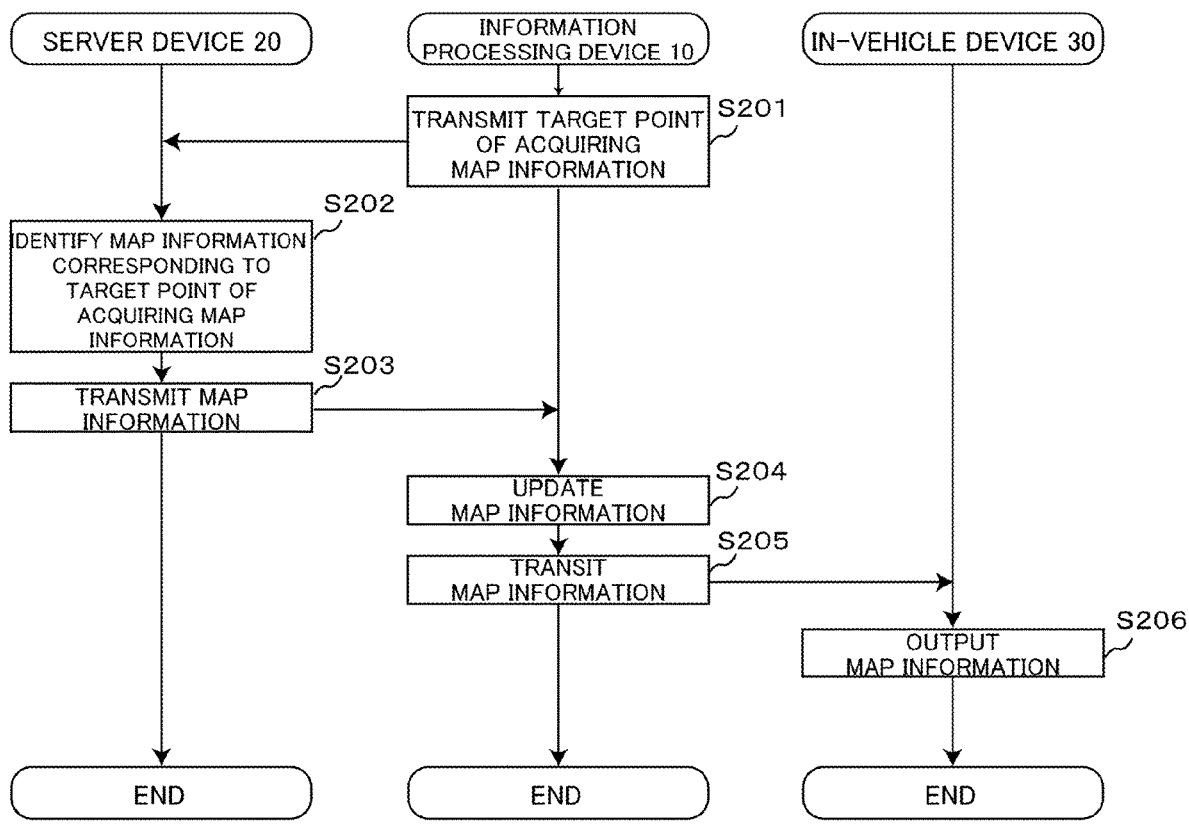
FIG. 7 is a sequence diagram illustrating an example of a map information acquisition process.

FIG. 7 is a sequence diagram illustrating an example of a map information acquisition process. The processing of this drawing is performed after the information processing device 10 determines a target point of acquiring map information. For example, the processing starts when the information processing device 10 accepts an operation of inputting an instruction for acquiring map information.

First, the communication unit 130 of the information processing device 10 transmits the target point of acquiring map information to the server device 20 (step S201). Note that the information transmitted by the communication unit 130 includes information indicating whether or not the target point of acquiring map information is the representative point.

Next, the map information identification unit 211 of the server device 20 identifies the map information 222 corresponding to the target point of acquiring map information (step S202). Specifically, the map information identification unit 211 refers to one or a plurality of target points of acquiring map information transmitted in step S201, respectively. When the target point of acquiring map information is the representative point, the map information identification unit 211 refers to the storage unit 220 and identifies the map information 222 of the target area represented by the representative point. When the target point of acquiring map information is not the representative point, the map information identification unit 211 identifies the area including the point as the target area corresponding to the point.

Note that, in a case when the same area is identified redundantly, the map information identification unit 211 treats as if one area as the area is identified. For example, there is a possibility that the representative point determined by the information processing device 10 as the target point of acquiring map information and the current location belong to the same area. In that case, the map information identification unit 211 identifies one map information 222 related to the area.

Next, the communication unit 230 of the server device 20 transmits the map information to the information processing device 10 (step S203). Specifically, the communication unit 230 transmits the map information 222 identified in step S202 to the information processing device 10.

Next, the map information acquisition unit 114 of the information processing device 10 updates the map information 122 (step S204). Specifically, the map information acquisition unit 114 refers to the information for identifying the area included in the map information 222 transmitted by the communication unit 230 of the server device 20. The map information acquisition unit 114 refers to the map information 122 and updates the map information 122 of the area corresponding to the information for identifying the area.

Next, the communication unit 130 of the information processing device 10 transmits the map information 122 to the in-vehicle device 30 (step S205). As an example, a trigger of this process is the start of communication between the information processing device 10 and the in-vehicle device 30. According to this example, the process in steps S201 to S204 may be performed multiple times until the communication between the information processing device 10 and the in-vehicle device 30 starts. Note that the trigger of this process is not limited to the start of the communication, and it is possible to be triggered by, for example, accepting an operation of inputting an instruction for transmitting map information to the information processing device 10. The map information 122 transmitted by the communication unit 130 of the information processing device 10 is received by the communication unit 330 of the in-vehicle device 30.

Note that, in case the in-vehicle device 30 stores the map information, after the information processing device 10 transmits the map information to the in-vehicle device 30 in step S205, the map information acquisition unit 114 of the information processing device 10 may delete the map information 122 from the storage unit 120.

Next, the output unit 340 of the in-vehicle device 30 outputs map information (step S206). After that, the processing of this sequence diagram in the update area determination system 1 finishes.

According to the present embodiment, it is possible to determine the area for updating map information appropriately without imposing an excessive burden on each device. In particular, since it is not required to perform pathfinding to determine the area, it is possible to reduce the processing load for updating map information as compared with the conventional technology that requires pathfinding. Also, when pathfinding is required, the map information to be updated cannot be obtained unless the device for acquiring the map information moves. However, according to the present embodiment, it is not essential that the information processing device moves, and the appropriate area is determined according to the position of the arbitrary two points being input. That is, it is possible to acquire the map information more efficiently at an arbitrary timing.

Note that it is also possible to display the map display screen 170 illustrated in FIG. 11 on the information processing device 10 when the map information acquisition unit 114 of the information processing device 10 acquires the map information in step S204. In addition, in step 206, when the output unit 340 of the in-vehicle device 30 outputs the map information, it is also possible to display the map information on the in-vehicle device 30. In that case, for example, the output unit 140 of the information processing device 10 may generate the screen information of the map display screen 170 and transmit it to the in-vehicle device 30, and the output unit 340 of the in-vehicle device 30 may display the map display screen 170 on the display. Alternatively, the output unit 340 of the in-vehicle device 30 may generate the screen information of the map display screen 170 and display it on the display.

Also, in the present embodiment, the information processing device 10 calculates the reference value and the distance and determines the update area. However, it is also possible that the server device 20 performs these processes. In that case, the server device 20 may include the target area determination unit 111, the distance calculation unit 112, the reference value determination unit 113, the map information acquisition unit 114, and the point identification unit 115.

In that case, the information processing device 10 transmits information regarding the two points whose designation is accepted to the server device 20. The server device 20 refers to the representative point information possessed by the server device 20, calculates the distance, determines the target area, and also determines whether or not the condition of finishing the determination of the target area is satisfied. After that, the server device 20 transmits the map information 222 of the target area to the information processing device 10.

Also, in the present embodiment, the map information 122 included in the information processing device 10 is output by the in-vehicle device 30, but it is also possible to display the map information 122 on the output device included in the information processing device 10. In that case, the in-vehicle device 30 is not an essential configuration for this system. Additionally, the in-vehicle device 30 may execute the processing content of the information processing device 10, and in that case, the information processing device 10 is not an essential configuration for this system.

Also, in the present embodiment, the point identification unit 115 identifies the two points based on the information input via the input unit 150 or the information acquired by the positioning signal receiving device 164. However, the point identification unit 115 may identify the two points by using information acquired from another device such as the in-vehicle device 30 or the like. For example, the input unit 350 of the in-vehicle device 30 receives input of the two points and transmits the information that has been input to the information processing device 10. The point identification unit 115 can determine the two points using the received information.

First Modification

Next, the processing of the update area determination system 1 in the first modification will be described. In the update area determination system 1 in this modification, one or more representative points are set in one area. Hereinafter, points different from the above-described embodiment will be described.

Figure 12:
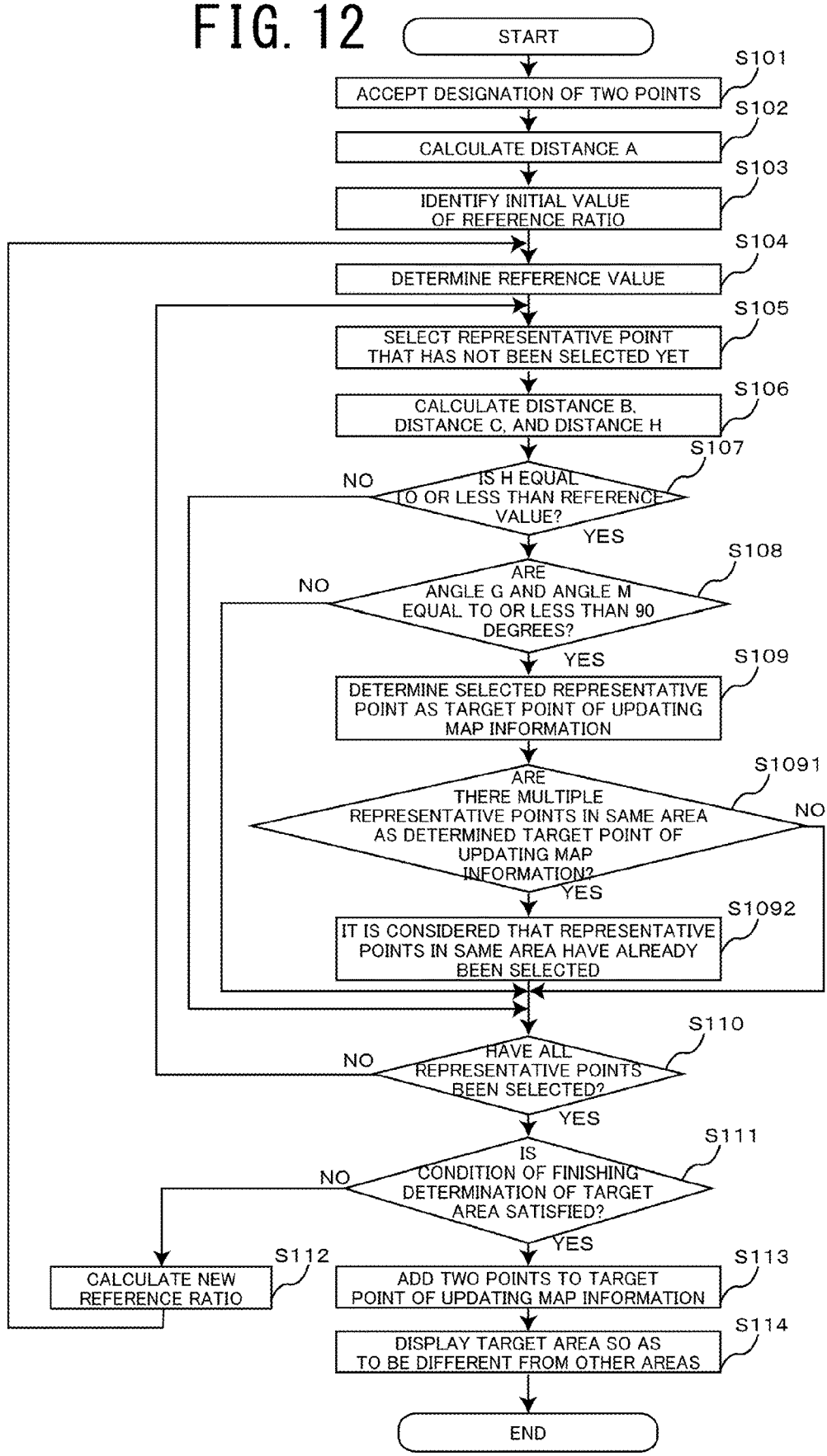
FIG. 12 is a flowchart illustrating an example of the process of determining an update area in the first modification.

FIG. 12 is a flowchart illustrating an example of the process of determining the update area in the first modification. As described above, in the region (not illustrated in the drawings) of the storage unit 220 of the server device 20, the correspondence between each representative point and each area is stored. In this modification, one or more representative points are associated with the information indicating one area stored in the region.

In step S109, after the target area determination unit 111 determines the selected representative point as the target point of updating map information, the target area determination unit 111 determines whether or not there are multiple representative points in the same area as the determined target point of updating map information (step S1091). Specifically, the target area determination unit 111 identifies the area corresponding to the target point of updating map information determined in step S109. The target area determination unit 111 determines whether or not a plurality of representative points are associated with the identified area.

When the target area determination unit 111 determines that there is a plurality of representative points in the same area as the determined target point of updating map information (when "YES" in step S1091), the target area determination unit 111 considers that the representative points of the same area have already been selected (step S1092). Specifically, the target area determination unit 111 associates a flag indicating that the representative point has already been selected with the representative point identifier of the representative point associated with the area identified in step S1091. After that, the target area determination unit 111 proceeds the process to step S110.

When the target area determination unit 111 determines that there are no multiple representative points in the same area as the determined target point of updating map information (when "NO" in step S1091), the target area determination unit 111 proceeds the process to step S110.

According to this modification, when a plurality of representative points is associated with one area, if at least any one of the representative points satisfies the condition, the area is treated as the target area of updating map information. Therefore, in case there is an inconvenience to be determined as the target area of the map information by one representative point, it is possible to take flexible measures. For example, by providing a plurality of representative points at intervals similar to other areas in an elongated area or an area being larger compared to other areas, even in a case whichever representative point is determined as the target point of acquiring map information, it is possible to obtain the map information of the area, and it is possible to respond more in line with the user's request.

Second Modification

Figure 13:
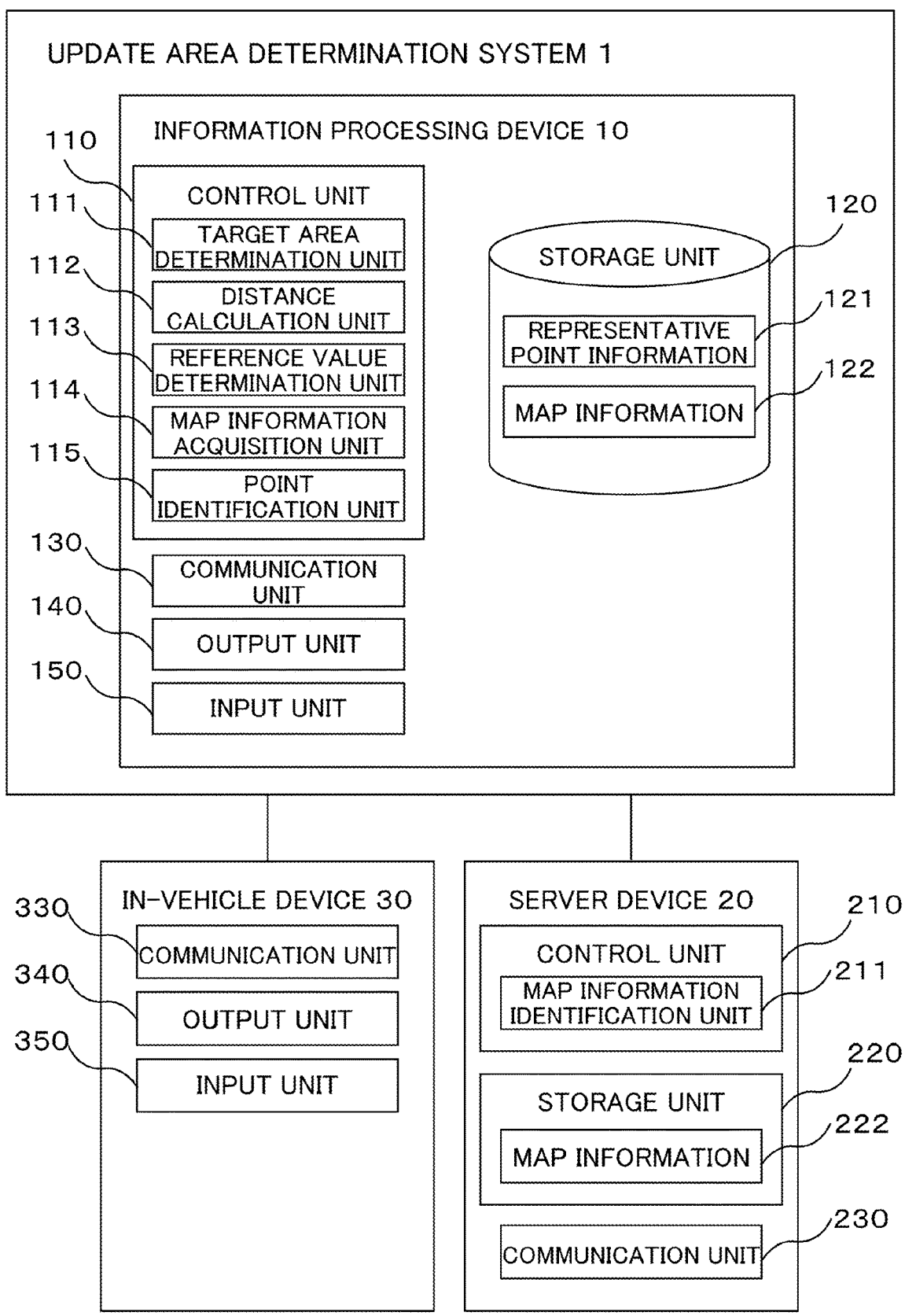
FIG. 13 is a diagram illustrating an example of a functional block configuration of the update area determination system in the second modification.

FIG. 13 is a diagram illustrating an example of a functional block configuration of the update area determination system 1 in the second modification. Hereinafter, points different from the above-described embodiment will be described. The update area determination system 1 in this modification includes the information processing device 10 and acquires the map information to be updated from the server device 20 that is not included in the update area determination system 1. The update area determination system 1 is communicably connected to each of the server device 20 and the in-vehicle device 30.

According to this modification, even in the update area determination system 1 that does not include the server device 20, it is possible to determine the area for updating map information appropriately without imposing an excessive burden on each device, as in the above-described embodiment.

Although the embodiments and modifications according to the present invention have been described above, the present invention is not limited to the example of the above-described embodiments but includes various modifications. For example, the example of the above-described embodiments has been described in detail for the sake of clarity of the present invention, and the present invention is not limited to those including all of the configurations described here. Also, it is possible to replace a part of the configuration of one example of one embodiment with the configuration of another example. Also, it is possible to add the configuration of another example to the configuration of one example of one embodiment. Also, it is possible to add, delete, or replace another configuration, regarding a part of the configuration of one example of each embodiment. Also, each of the above-described configurations, functions, processing units, processing means, and the like may be realized by hardware by designing a part or all of them with, for example, an integrated circuit, or the like. Also, the control lines and information lines in the drawings illustrate what is considered to be necessary for the description and do not necessarily illustrate all of them. It is also possible to consider that almost all configurations are interconnected.

Also, the functional configurations of the information processing device 10, the server device 20, and the in-vehicle device 30 described above are classified according to the main processing contents in order to facilitate understanding. The invention of the present application is not limited by the method and name of classifying the configuration components. The configurations of the information processing device 10, the server device 20, and the in-vehicle device 30 can also be further classified into more configuration components according to the processing content. It is also possible to categorize one configuration component so that the one configuration component further performs more processing.

REFERENCE SIGNS LIST

1 Update area determination system
10 Information processing device
20 Server device
30 In-vehicle device
110, 210 Control unit
111 Target area determination unit
112 Distance calculation unit
113 Reference value determination unit
114 Map information acquisition unit
115 Point identification unit
120, 220 Storage unit
121 Representative point information
122 Map information
130, 230, 330 Communication unit
140, 340 Output unit
150, 350 Input unit
161, 261 Arithmetic device
162, 262 Memory
163, 263 External storage device
164 Positioning signal receiving device
165 Input I/F
166 Output I/F
167, 267 Communication device
168, 268 Storage medium driving device
169 Medium
211 Map information identification unit
222 Map information
A, B, C, H Distance
d Representative point
g Current location
G, M Angle
m Destination

The invention claimed is:

1. A method for optimizing delivery of updated map information to an in-vehicle device that is located within a vehicle, the method comprising:
receiving, by a processor that is remote from the in-vehicle device, target points on a map, wherein the target points include a first point that identifies a current location of the vehicle device and a second point that identifies a destination for the vehicle;
calculating, by the processor, a distance between the first point and the second point;
determining, by the processor, a reference value using the distance;
executing, by the processor, a target area determination procedure that determines a target area by using the distance and position information of a representative point preset for each of a plurality of areas in the map, wherein when distances between the respective representative point preset of each of the plurality of areas and a straight line connecting the first point and the second point satisfies a predetermined condition determined by the reference value, and the area represented by the respective representative point preset is determined as the target area;
determining, by the processor, the updated map information based on the target area, wherein the updated map information contains a subset of available map information stored in a database; and
transmitting, by the processor, the updated map information to the in-vehicle device, wherein the in-vehicle device displays the target area so as to be different from a region on the map excluding the target area.

2. The method according to claim 1, wherein the predetermined condition is satisfied when the distance is equal to or less than the reference value.

3. The method according to claim 1, wherein the predetermined condition is not satisfied, the reference value is changed according to a predetermined rule.

4. The method for according to claim 1, wherein:
the reference value is a predetermined ratio obtained by multiplying the distance by a reference ratio, and
when a number of target areas included in the updated map information is less than a predetermined number, the reference ratio is increased.

5. The method according to claim 4, wherein the reference ratio is increased when the number of the target areas included in the updated map information is less than the predetermined number and the reference ratio is less than a predetermined value.

6. The method according to claim 1, wherein when the respective representative point preset satisfies the predetermined condition and, in a triangle formed by connecting the first point, the second point, and the respective representative point preset, both of angles having each of the first point and the second point as vertices are 90 degrees or less, an area represented by the respective representative point preset is determined as the target area.

7. The method according to claim 1, wherein in the target area determination procedure, each of the areas having the first point and the second point is determined as the target area.

8. The method of claim 1, wherein the processor is incorporated in an information processing device or a server.

9. An device for optimizing delivery of updated map information to an in-vehicle device that is located within a vehicle, the device comprising:
a communication interface;
a memory; and
a processor that is communicatively coupled to the communication interface and the memory,
wherein the processor is configured to:
receive, using the communication interface, target points on a map, wherein the target points include a first point that identifies a current location of the vehicle device and a second point that identifies a destination for the vehicle,
calculate a distance between the first point and the second point,
determine a reference value using the distance,
execute a target area determination procedure that determines a target area by using the distance and position information of a representative point preset for each of a plurality of areas in the map, wherein when distances between the respective representative point preset of each of the plurality of areas and a straight line connecting the first point and the second point satisfies a predetermined condition determined by the reference value, the area represented by the respective representative point preset is determined as the target area determine the updated map information based on the target area, wherein the updated map information contain a subset of available map information stored in a database; and transmit, using the communication interface, the updated map information to the in-vehicle device, wherein the in-vehicle device displays the target area so as to be different from a region on the map excluding the target area.

10. A non-transitory computer read storage medium storing instructions for optimizing delivery of updated map information to an in-vehicle device that is located within a vehicle, the instructions when executed by a processor cause the processor to execute a method comprising:

receiving, by the processor, target points on a map, wherein the target points include a first point that identifies a current location of the vehicle device and a second point that identifies a destination for the vehicle;

calculating, by the processor, a distance between the first point and second point;

determining, by the processor, a reference value using the distance;

executing, by the processor, a target area determination procedure that determines a targeted area by using the distance and position information of a representative point preset for each of a plurality of areas, wherein when distances between the respective representative point preset of each of the plurality of areas and a straight line connecting the first point and the second point satisfies a predetermined condition determined by the reference value, and the area represented by the respective representative point preset is determined as the target area; determining, by the processor, the updated map information based on the target area, wherein the updated map information contains a subset of available map information stored in a database; and transmitting, by the processor, the updated map information to the in-vehicle device, wherein the in-vehicle device displays the target area so as to be different from a region on the map excluding the target area.

* * * * *